Jan. 10, 1928.

F. A. JONES 1,655,768

PLATFORM DISPLAY DEVICE

Filed March 30, 1925   2 Sheets-Sheet 2

INVENTOR.
Frank A. Jones
by John M. Strehli
ATTORNEY.

Patented Jan. 10, 1928.

1,655,768

UNITED STATES PATENT OFFICE.

FRANK A. JONES, OF DAYTON, KENTUCKY.

PLATFORM DISPLAY DEVICE.

Application filed March 30, 1925. Serial No. 19,244.

My invention belongs to that class of display devices in which the figure or object to be displayed is placed or mounted upon a platform and is revolved so that various parts of the object can be seen and observed as the same is revolving.

These devices are usually employed in show windows, display rooms, where dresses, cloaks and wearing apparel is exhibited for sale, at wholesale or retail, and in shops and department stores, and the like.

My present device does not revolve continuously as is usually the case in these devices, nor has it a forward and backward action; the action in my present device being intermittent, that is, while it makes a complete revolution or cycle, it is interrupted or intercepted at a predetermined time so that it stands still for an instant and then passes on for another period of time, and so on until the entire cycle is made.

In the present instance it is interrupted four times; thus intermittent action is given to the platform or table upon which the article is to be displayed or mounted.

It will be understood that instead of an intermittent action producing four stops and starts, that I may use one or any number of such intermittent periods, not confining myself to any particular number, and it will be understood that I may stop the platform at any of these intermittent points for as long a period as found practical.

My new display device is very simple and highly efficient in its operation and I produce a device of this character possessing marked utility.

Figure 1:
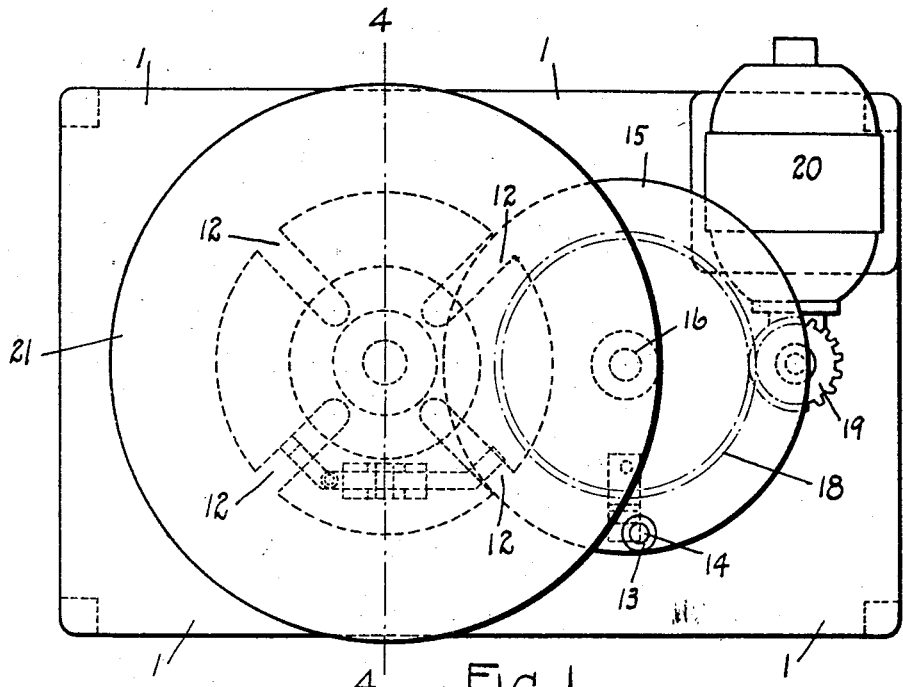
Figure 2:
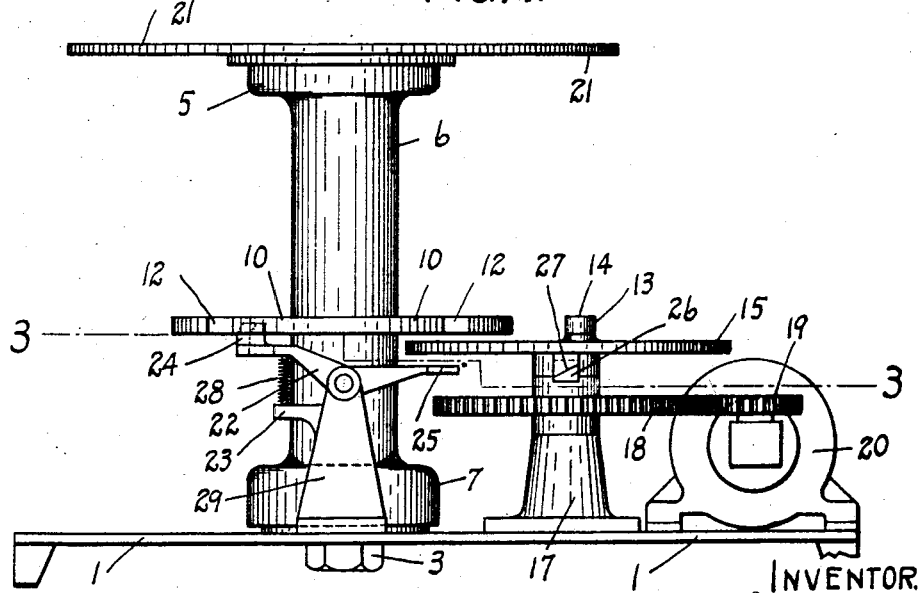
Figure 3:
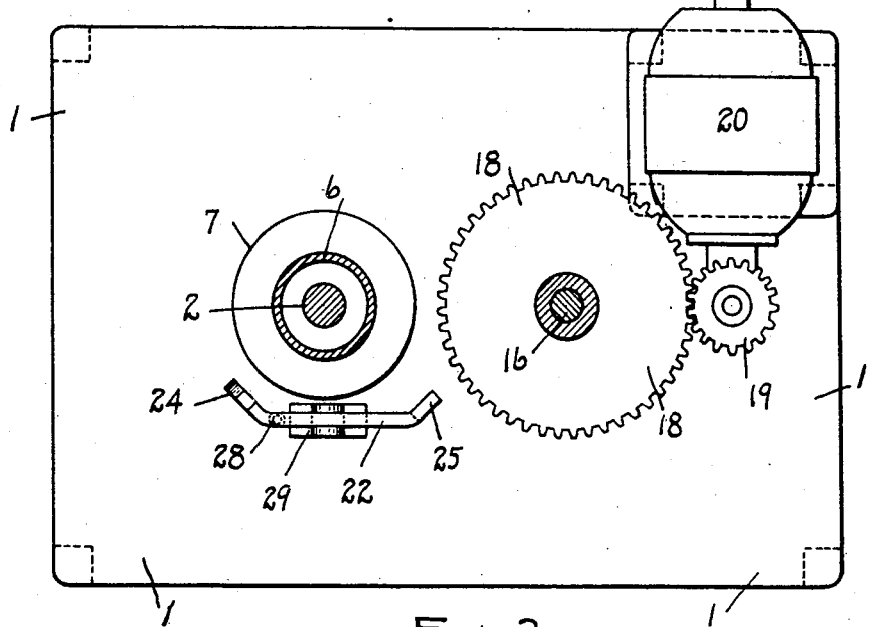
Figure 4:
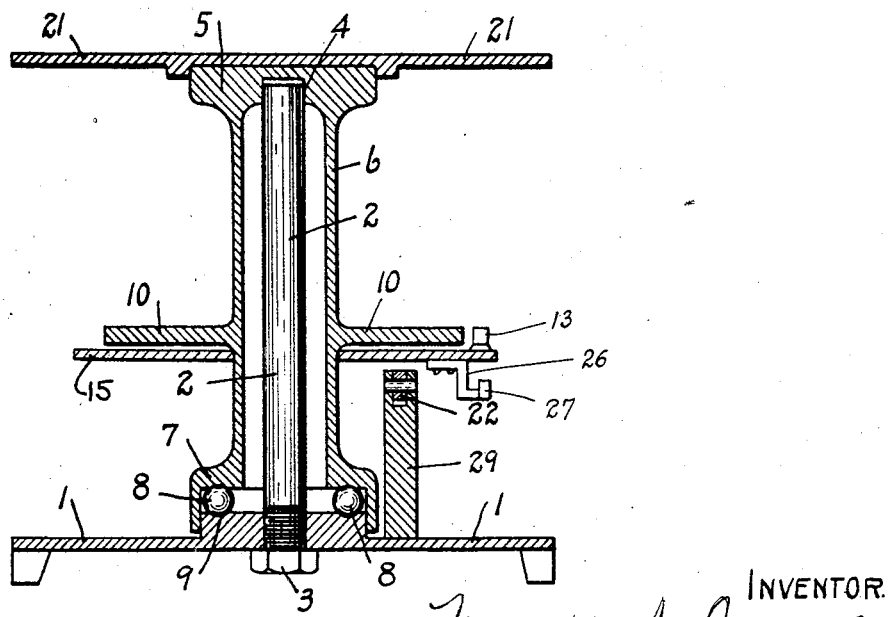

In the accompanying drawing forming part of this specification:

Fig. 1, is a plan view of my new device,
Fig. 2, is a side elevation thereof,
Fig. 3, is a section taken on line 3—3 of Fig. 2, and
Fig. 4, is a section taken on line 4—4 of Fig. 1.

In the drawing illustrating one form of my invention, I provide a base 1, in which is securely mounted a pilot or guide post 2, secured by a lock nut 3. At a point 4, I pivotally mount the head 5 of the cylinder or hollow tube 6. This cylinder 6 has at its lower extremity a raceway 7, into which the balls 8 engage, to form a thrust bearing against the raceway 9 of the base 1.

Located between the head 5 and the raceway 7, I provide a slot cam 10 having the slots 12, into which engages a roller 13, mounted on a pin 14, which in turn is secured in a disc 15. This disc is revolved from a shaft 16, mounted in the housing 17, by the gear 18, which is carried thereon; said gear 18 meshing with small gear 19, which is driven by a motor 20.

On the head 5 of cylinder 6, I mount a table or platform 21, upon which I place the object to be displayed.

This table is revolved by the cylinder 6 which is turned intermittently by the cam 10, in turn, being revolved by the disc 15, when the roller 13 enters one of the slots 13; said disc 15 being revolved by the motor 20 through gears 18 and 19.

In order to bring the table 21 to a positive stop I provide a rocker arm 22, pivotally mounted in a bracket 23, said rocker arm having a finger 24, which engages into the slots 12, and at the opposite end of the said rocker arm I provide the extensions 25, which engage with a trip 26, having the inclined surface 27, said trip being located on the bottom side of disc 15; a spring 28 holds the finger 24 in contact with the cam 10 by reason of its compression through medium of a spring support 29 which is mounted on bracket 23.

As the disc 25 is revolved the roller 14 enters one of the slots 12, there being four in the present instance, and before any revolving action takes place, the inclined surface 27 engages under the finger 25, which lowers out of engagement the finger 24 from its position in one of the slots 12, the cam 10 is now released and the roller 14 passing to its limit of travel in one of the slits 12 carries with it the cam 10 and its connecting parts until the roller 14 passes out of the particular slot, meanwhile the finger 24 having been disengaged by the trip 26, said finger 24 presses up against the bottom of the cam 10 until the said finger 24 engages another one of the slots 12; this engagement takes place just as the roller 13 is passing out of its respective slot, thus the table 21, is held stationary until the roller 14 makes a complete revolution and enters another slot 12 as before described; this imparting an intermittent motion.

The trip acts in its complete function just as roller 13 is entering one of the slots 12.

What I claim as new and my invention and desire to secure by Letters Patent is:

1. A platform display device comprising a base plate having an upwardly extending cylindrical projection, the upper face of said projection having an annular groove forming a ball race, a stationary pilot pin extending upwardly from the central portion of said projection, a rotatable cylinder fitting over said pin and having a recess in the under side of its head snugly fitting on the upper end of the pin, the lower portion of said cylinder being provided with a ball race and an annular skirt, the latter surrounding said projection, anti friction balls occupying said races and bearing the weight of the cylinder, a platform arranged at the upper end of the cylinder, means for revolving the cylinder in a single direction only, and means for stopping the cylinder intermittently during its rotation.

2. In a platform display device, a rotatable member provided with a supporting platform, a disc mounted on said member and having radial slots, a rocking lever provided at one end with a pin to engage each of said slots for locking the disc against rotation, a continuously rotating disc having a projection thereon adapted to engage each of said slots for intermittently rotating said member, and an operating member for the rocking lever mounted on the disc having the projection, and adapted to release said pin.

3. A display device comprising a member rotatable about a vertical axis and having a platform at its upper end, a disc mounted on said member and provided with radial slots, a rocking lever provided at one end with a pin to enter each of said slots and intermittently lock the member against rotation, a spring for moving the lever in one direction to cause the pin to enter each of said slots, a continuously rotating driving disc provided with a roller adapted to enter each of said slots, and a cam on the driving disc adapted to engage one end of the lever for disengaging the pin from the slotted disc.

4. A display device comprising a base carrying fixed vertical pins, a driving gear on one of said pins and a rotatable cylinder on the other one of the pins, a slotted disc fixed to said cylinder, a driving disc fixed to the gear, a rocking lever supported by said base and having a pin at one end adapted to enter each slot in the slotted disc for intermittently latching the latter against rotation, a roller on one side of the driving disc adapted to enter each of the slots for intermittently rotating the slotted disc, and a cam on the other side of the driving disc adapted to engage one end of the rocking lever for disengaging the pin from the slots of the slotted disc.

In testimony whereof, I affix my signature at Cincinnati, Ohio this 28th day of March, 1925.

FRANK A. JONES.